United States Patent
Liao et al.

(10) Patent No.: US 10,477,413 B2
(45) Date of Patent: Nov. 12, 2019

(54) METHOD AND APPARATUS FOR NETWORK CAPACITY EXPANSION

(71) Applicant: CHINA UNITED NETWORK COMMUNICATIONS GROUP COMPANY LIMITED, Beijing (CN)

(72) Inventors: Hui Liao, Beijing (CN); Haibin Li, Beijing (CN); Rong Wang, Beijing (CN); Zhijun Wang, Beijing (CN); Jin Huang, Beijing (CN); Ji Xiao, Beijing (CN)

(73) Assignee: CHINA UNITED NETWORK COMMUNICATIONS GROUP COMPANY LIMITED, Beijing (CN)

(*) Notice: Subject to any disclaimer, the term of this patent is extended or adjusted under 35 U.S.C. 154(b) by 0 days.

(21) Appl. No.: 15/807,400

(22) Filed: Nov. 8, 2017

(65) Prior Publication Data
US 2018/0070245 A1    Mar. 8, 2018

Related U.S. Application Data

(63) Continuation of application No. PCT/CN2016/102869, filed on Oct. 21, 2016.

(30) Foreign Application Priority Data

Oct. 23, 2015   (CN) .......................... 2015 1 0698900

(51) Int. Cl.
*H04W 16/18* (2009.01)
*H04L 12/26* (2006.01)
(Continued)

(52) U.S. Cl.
CPC ......... *H04W 16/18* (2013.01); *H04L 43/0876* (2013.01); *H04L 43/16* (2013.01);
(Continued)

(58) Field of Classification Search
CPC ..... H04L 43/0876; H04L 43/16; H04L 67/22; H04W 16/10; H04W 16/18; H04W 16/24;
(Continued)

(56) References Cited

U.S. PATENT DOCUMENTS

| 6,209,033 B1* | 3/2001 | Datta | H04L 41/0813 370/232 |
| 6,885,641 B1* | 4/2005 | Chan | H04L 41/142 370/252 |

(Continued)

FOREIGN PATENT DOCUMENTS

| CN | 101437232 A | 5/2009 |
| CN | 102938901 A | 2/2013 |

(Continued)

OTHER PUBLICATIONS

Dehghan et al., W-CDMA capacity and planning issues, Jun. 2000, Electronics & Communication Engineering Journal, vol. 12, Issue 3, pp. 101-118 (Year: 2000).*

(Continued)

*Primary Examiner* — Eric Nowlin
(74) *Attorney, Agent, or Firm* — J.C. Patents

(57) ABSTRACT

The application provides a method and an apparatus for network capacity expansion, including collecting online record information of mobile users in a plurality of cells; respectively acquiring target service types in each of the cells; for each cell, acquiring rates of the target service types in the cell; for each of the target service types, acquiring a target rate of the target service type; for each cell, acquiring a target rate experienced by the individual user and an actual average rate experienced by the user in the cell; for each cell, determining a target cell according to the target rate experienced by the individual user and the actual average rate experienced by the user in the cell, as well as the utilization ratio of the wireless resources and the number of the online (Continued)

users; performing the network capacity expansion on the target cell.

14 Claims, 12 Drawing Sheets

(51) Int. Cl.
  *H04L 29/08* (2006.01)
  *H04W 16/24* (2009.01)
  *H04W 24/02* (2009.01)
(52) U.S. Cl.
  CPC ............. *H04L 67/22* (2013.01); *H04W 16/24* (2013.01); *H04W 24/02* (2013.01)
(58) Field of Classification Search
  CPC ..... H04W 24/02; H04W 24/10; H04W 84/18; H04W 88/06
  See application file for complete search history.

(56) References Cited

U.S. PATENT DOCUMENTS

| | | | | |
|---|---|---|---|---|
| 7,009,936 B1* | 3/2006 | Kangas | H04W 28/18 | 370/229 |
| 7,898,947 B2* | 3/2011 | Briscoe | H04L 41/0806 | 370/230 |
| 8,023,429 B2* | 9/2011 | Briscoe | H04L 41/0806 | 370/252 |
| 8,208,490 B2* | 6/2012 | Briscoe | H04L 41/0806 | 370/468 |
| 8,441,997 B2* | 5/2013 | Yun | H04W 24/00 | 370/329 |
| 8,644,141 B2* | 2/2014 | Gao | H04W 24/02 | 370/229 |
| 8,861,461 B2* | 10/2014 | Marinier | H04B 7/0626 | 370/329 |
| 8,976,655 B2* | 3/2015 | Weill | H04W 24/08 | 370/232 |
| 8,995,255 B2* | 3/2015 | Chou | H04W 4/70 | 370/229 |
| 9,037,142 B2* | 5/2015 | Jovanovic | H04W 16/04 | 455/446 |
| 9,137,712 B2* | 9/2015 | Ianev | H04W 36/0022 | |
| 9,154,978 B2* | 10/2015 | Chou | H04W 4/70 | |
| 9,438,401 B2* | 9/2016 | Marinier | H04W 74/004 | |
| 9,516,628 B2* | 12/2016 | Chou | H04W 72/0413 | |
| 9,526,091 B2* | 12/2016 | Chou | H04W 72/0413 | |
| 9,538,413 B2* | 1/2017 | Chou | H04W 4/70 | |
| 9,565,577 B2* | 2/2017 | Kapnadak | H04W 24/02 | |
| 9,609,544 B2* | 3/2017 | Raleigh | H04L 41/0893 | |
| 9,794,809 B2* | 10/2017 | Chou | H04W 4/70 | |
| 9,924,367 B2* | 3/2018 | Kapnadak | H04W 24/02 | |
| 9,999,023 B2* | 6/2018 | Chou | H04W 36/14 | |
| 10,075,855 B2* | 9/2018 | Ben Ami | H04W 24/02 | |
| 10,136,456 B2* | 11/2018 | Song | H04W 16/02 | |
| 10,158,519 B2* | 12/2018 | Chou | H04W 4/70 | |
| 2008/0049614 A1* | 2/2008 | Briscoe | H04L 41/0806 | 370/230 |
| 2009/0073901 A1* | 3/2009 | Yi | H04W 28/18 | 370/277 |
| 2009/0163223 A1 | 6/2009 | Casey | | |
| 2010/0144346 A1 | 6/2010 | Malomsoky et al. | | |
| 2010/0235357 A1* | 9/2010 | Briscoe | H04L 41/0806 | 707/737 |
| 2010/0306353 A1* | 12/2010 | Briscoe | H04L 41/0806 | 709/221 |
| 2011/0268044 A1* | 11/2011 | Yun | H04W 24/00 | 370/329 |
| 2011/0300827 A1 | 12/2011 | Hu et al. | | 455/405 |
| 2011/0314145 A1* | 12/2011 | Raleigh | H04L 41/0893 | 709/224 |
| 2012/0039166 A1* | 2/2012 | Gao | H04W 24/02 | 370/221 |
| 2012/0230268 A1* | 9/2012 | Marinier | H04B 7/0626 | 370/329 |
| 2012/0309357 A1* | 12/2012 | Ianev | H04W 36/0022 | 455/411 |
| 2012/0324091 A9* | 12/2012 | Raleigh | H04L 41/0893 | 709/224 |
| 2013/0021928 A1* | 1/2013 | Weill | H04W 24/08 | 370/252 |
| 2013/0023217 A1 | 1/2013 | Zhuang et al. | | |
| 2013/0235726 A1* | 9/2013 | Frederiksen | H04W 36/22 | 370/235 |
| 2013/0242720 A1* | 9/2013 | Chou | H04W 72/0413 | 370/221 |
| 2013/0279368 A1* | 10/2013 | Chou | H04W 4/70 | 370/254 |
| 2014/0031047 A1* | 1/2014 | Jovanovic | H04W 16/04 | 455/446 |
| 2014/0036656 A1* | 2/2014 | Chou | H04W 4/70 | 370/216 |
| 2014/0095706 A1* | 4/2014 | Raleigh | H04L 41/0893 | 709/224 |
| 2014/0140278 A1* | 5/2014 | Chou | H04W 72/0413 | 370/328 |
| 2015/0029990 A1* | 1/2015 | Marinier | H04B 7/0626 | 370/329 |
| 2015/0141024 A1* | 5/2015 | Kapnadak | H04W 24/02 | 455/446 |
| 2015/0189521 A1* | 7/2015 | Chou | H04W 4/70 | 455/67.11 |
| 2015/0215814 A1* | 7/2015 | Raleigh | H04L 41/0893 | 370/231 |
| 2015/0230184 A1* | 8/2015 | Raleigh | H04L 41/0893 | 370/230 |
| 2015/0289146 A1 | 10/2015 | Ouyang et al. | | 47/127 |
| 2015/0373563 A1* | 12/2015 | Chou | H04W 36/14 | 370/252 |
| 2016/0007216 A1* | 1/2016 | Chou | H04W 4/70 | 370/216 |
| 2016/0165472 A1* | 6/2016 | Gopalakrishnan | H04W 24/10 | 455/67.11 |
| 2016/0226739 A1* | 8/2016 | Hamzeh | H04L 27/0012 | |
| 2016/0330763 A1* | 11/2016 | Marinier | H04B 7/0626 | |
| 2016/0337883 A1* | 11/2016 | Raleigh | H04L 41/0893 | |
| 2016/0353291 A1* | 12/2016 | Tarlazzi | H04B 17/19 | |
| 2016/0360539 A1* | 12/2016 | Ben Ami | H04W 24/02 | |
| 2017/0070900 A1* | 3/2017 | Chou | H04W 4/70 | |
| 2017/0111800 A1* | 4/2017 | Kapnadak | H04W 24/02 | |
| 2017/0135099 A1* | 5/2017 | Song | H04W 16/02 | |
| 2017/0180050 A1* | 6/2017 | Littlewood | H04J 14/0227 | |
| 2017/0331706 A1* | 11/2017 | Lu | H04L 41/0668 | |
| 2017/0359754 A1* | 12/2017 | Yousefi'zadeh | H04W 24/08 | |
| 2018/0007572 A1* | 1/2018 | Chou | H04W 4/70 | |
| 2018/0070245 A1* | 3/2018 | Liao | H04L 43/0876 | |
| 2018/0103488 A1* | 4/2018 | Marinier | H04B 7/0626 | |
| 2018/0184324 A1* | 6/2018 | Raleigh | H04L 41/0893 | |
| 2018/0220421 A1* | 8/2018 | Zhang | H04L 5/1469 | |
| 2018/0234166 A1* | 8/2018 | Peponides | H04B 7/18513 | |
| 2018/0262947 A1* | 9/2018 | Raleigh | H04L 41/0893 | |
| 2018/0263016 A1* | 9/2018 | Chou | H04W 36/14 | |
| 2018/0367421 A1* | 12/2018 | Cloonan | H04L 41/5067 | |
| 2019/0014487 A1* | 1/2019 | Yang | H04W 24/02 | |
| 2019/0021099 A1* | 1/2019 | Hamzeh | H04L 27/0012 | |

FOREIGN PATENT DOCUMENTS

| | | | | |
|---|---|---|---|---|
| CN | 103002459 A | | 3/2013 | |
| CN | 103002459 A | * | 3/2013 | ............ H04W 16/04 |
| CN | 103338462 A | | 10/2013 | |
| CN | 104038941 A | | 9/2014 | |
| CN | 104125580 A | | 10/2014 | |
| CN | 104301915 A | | 1/2015 | |
| CN | 104394539 A | * | 3/2015 | |
| CN | 105407494 A | | 3/2016 | |
| JP | 2012-004874 A | | 1/2012 | |
| JP | 2014-187571 A | | 10/2014 | |
| JP | 2016-517221 A | | 6/2016 | |
| WO | WO-2010068156 A1 | * | 6/2010 | ......... H04L 41/5003 |

(56) References Cited

FOREIGN PATENT DOCUMENTS

| WO | WO 2010/095989 A1 | 8/2010 | | |
|----|-------------------|--------|---|---|
| WO | WO 2011/058818 A1 | 5/2011 | | |
| WO | WO-2013030429 A1 * | 3/2013 | ............ | H04W 16/18 |
| WO | WO-2013037230 A1 * | 3/2013 | ............ | H04W 16/04 |
| WO | WO 2015/087565 A1 | 6/2015 | | |

OTHER PUBLICATIONS

Amaldi et al., Radio planning and coverage optimization of 3G cellular networks, Aug. 2008, Kluwer Academic Publishers, Journal Wireless Networks, vol. 14, Issue 4, pp. 435-447 (Year: 2008).*
Chiaraviglio et al., Energy-Efficient Planning and Management of Cellular Networks, Jan. 11, 2012, IEEE, 2012 9th Annual Conference on Wireless On-Demand Network Systems and Services (WONS) (Year: 2012).*
International Search Report of corresponding International PCT Application No. PCT/CN2016/102869, dated Jan. 18, 2017.
The Japanese Examination Report of corresponding Japan patent application No. 2017-559700, dated Oct. 9, 2018.
Lee, Tong et al., "Research on Capacity Planning of 4G Network Based on Business Perception and Regional Value" China Academic Journal Electronic Publishing House—Telecom Engineering Technics and Standardization; vol. 28, Issue 9; (Sep. 2015); pp. 11-15.
Zongchao, Liu, "System of Traffic Analysis and Resource Optimization on Mobile Internet" Dissertation for the Master Degree of Beijing University of Posts and Telecommunications; (Jan. 2014).
The Chinese First Examination Report of corresponding Chinese application No. 201510698900.2, dated Apr. 4, 2018.
The extended European Search Report of corresponding European application No. 16856936.6-1216-3367719, dated Feb. 11, 2019.

* cited by examiner

METHOD AND APPARATUS FOR NETWORK CAPACITY EXPANSION

CROSS-REFERENCE TO RELATED APPLICATIONS

This application is a continuation of International Application No. PCT/CN2016/102869, filed on Oct. 21, 2016, which claims priority to Chinese Patent Application No. 201510698900.2, filed on Oct. 23, 2015, both of which are hereby incorporated by reference in their entireties.

TECHNICAL FIELD

The present application relates to the field of communication technology, and in particular to a method and an apparatus for network capacity expansion.

BACKGROUND

With the rapid spread of intelligent terminals, the flow carried by data services of a mobile internet is growing dramatically, and the capacity of the current network cannot meet daily demands of the users for internet access, therefore, the capacity of network is in need of expansion, such a method may also be referred to as network capacity expansion.

For now, the method for the network capacity expansion is mainly performing network capacity expansion according to the conditions of wireless resource load in a cell. And specifically, if the utilization ratio of wireless resources in a cell exceeds 60%, and there are more than 15 online users, then the network capacity expansion is performed for this cell.

Nonetheless, under some special circumstances, for example, the utilization ratio of wireless resources in a cell is above 60%, and the number of online users is more than 15, but all the online users are located at the center of the cell, namely, the users are enjoying excellent experience, and the network needs no capacity expansion. In such a case, it will cause waste of resources because the cell is determined as requiring network capacity expansion when the current capacity expansion method is adopted.

SUMMARY

The present application provides a method and an apparatus for network capacity expansion, for addressing the problem in the prior art that, the network capacity expansion is performed for cells in no need of network capacity expansion, thus causing waste of resources.

A first aspect of the present application provides a method for network capacity expansion, including:

collecting online record information of mobile users in a plurality of cells, wherein, the online record information of the mobile users includes user identifications, service types corresponding to the user identifications, and uplink traffics, downlink traffics and online durations corresponding to the service types;

respectively acquiring target service types in each of the plurality of cells, according to each of the service types in the plurality of cells, an uplink traffic and an downlink traffic corresponding to each of the service types and a preset threshold corresponding to each of the service types;

for each cell, acquiring rates of the target service types in the cell according to total traffics corresponding to the target service types in the cell and the online durations of the target service types;

for each of the target service types, acquiring a target rate of the target service type according to the rates corresponding to the target service type in different cells;

for each of the target service types, acquiring a weight of the target service type and a first number of concurrent services of an individual user, according to the online durations corresponding to the target service type in different cells, a second number of the user identifications corresponding to the target service type, and a recorded number of the target service type under the user identifications corresponding to the target service type;

for each cell, acquiring a target rate experienced by the individual user and an actual average rate experienced by the individual user in the cell, according to uplink traffics, downlink traffics, the online durations, the target rates and the weights of the target service types and the first number of concurrent services of the individual user in the cell;

for each cell, acquiring a utilization ratio of wireless resources and a third number of online users in the cell, and determining a target cell according to the target rate experienced by the individual user and the actual average rate experienced by the individual user in the cell, as well as the utilization ratio of the wireless resources and the third number of the online users; wherein, the target rate experienced by the individual user in the target cell is larger than the actual average rate experienced by the individual user in the target cell, the utilization ratio of the wireless resources in the target cell is larger than a preset threshold, and the third number of online users in the target cell is larger than a preset threshold; and performing the network capacity expansion on the target cell.

A second aspect of the present application provides an apparatus for network capacity expansion, including:

a collection module, configured to collect online record information of mobile users in a plurality of cells, wherein, the online record information of the mobile users includes user identifications, service types corresponding to the user identifications, and uplink traffics, downlink traffics and online durations corresponding to the service types;

a first acquisition module, configured to respectively acquire target service types in each of the cells, according to each of the service types in the plurality of cells, the uplink traffic and the downlink traffic corresponding to each of the service types, and a preset threshold corresponding to each of the service types;

a second acquisition module, configured to, for each cell, acquire rates of the target service types in the cell, according to total traffics corresponding to the target service types in the cell and online durations of the target service types;

a third acquisition module, configured to, for each of the target service types, acquire a target rate of the target service type according to rates corresponding to the target service type in different cells;

a fourth acquisition module, configured to, for each of the target service types, acquire a weight of the target service type and the number of concurrent services of an individual user, according to the online durations corresponding to the target service type in different cells, online durations corresponding to other target service types other than the target service type in different cells, the number of user identifications corresponding to the target service type, and a recorded number of the target service type under the user identifications corresponding to the target service type;

a fifth acquisition module, configured to, for each cell, acquire a target rate experienced by the individual user and an actual average rate experienced by the user in the cell, according to uplink traffics, downlink traffics, the online durations, the target rates and the weights of the target service types and the number of concurrent services of the individual user in the cell;

a determination module, configured to, for each cell, acquire a utilization ratio of wireless resources and the number of online users in the cell, and determining a target cell according to the target rate experienced by the individual user and the actual average rate experienced by the user in the cell, as well as the utilization ratio of the wireless resources and the number of online users; wherein, the target rate experienced by the individual user in the target cell is larger than the actual average rate experienced by the user in the target cell, and the utilization ratio of the wireless resources in the target cell is larger than a preset threshold, and the number of online users in the target cell is larger than the preset threshold; and a capacity expansion module, configured to perform network capacity expansion on the target cell.

The present application provides a method and an apparatus for network capacity expansion, including collecting online record information of mobile users in a plurality of cells, wherein, the online record information of the mobile users includes user identifications, service types corresponding to the user identifications, and uplink traffics, downlink traffics and online durations corresponding to the service types; respectively acquiring target service types in each of the cells, according to each of the service types in the plurality of cells, the uplink traffic and the downlink traffic corresponding to each of the service types and a preset threshold corresponding to each of the service types; for each cell, acquiring rates of the target service types in the cell according to total traffics corresponding to the target service types in the cell and online durations of the target service types; for each of the target service types, acquiring a target rate of the target service type according to rates corresponding to the target service type in different cells; for each of the target service types, acquiring a weight of the target service type and the number of concurrent services of an individual user, according to the online durations corresponding to the target service type in different cells, online durations corresponding to other target service types other than the target service type in different cells, the number of the user identifications corresponding to the target service type, and a recorded number of the target service type under the user identifications corresponding to the target service type; for each cell, acquiring a target rate experienced by the individual user and an actual average rate experienced by the user in the cell, according to uplink traffics, downlink traffics, the online durations, the target rates and the weights of the target service types and the number of concurrent services of the individual user in the cell; for each cell, acquiring a utilization ratio of wireless resources and the number of online users in the cell, and determining a target cell according to the target rate experienced by the individual user and the actual average rate experienced by the user in the cell, as well as the utilization ratio of the wireless resources and the number of the online users; wherein, the target rate experienced by the individual user in the target cell is larger than the actual average rate experienced by the user in the target cell, the utilization ratio of the wireless resources in the target cell is larger than a preset threshold, and the number of online users in the target cell is larger than a preset threshold; and performing the network capacity expansion on the target cell. In such a way, according to the utilization ratio of wireless resources, the actual average rate experienced by the user and the target rate experienced by the individual user in the cell, a target cell can be determined and the network capacity expansion is performed on the target cell, thereby improving the user experience in the target cell, and meanwhile avoiding the problem of resource waste due to capacity expansion of cells with good user experience.

BRIEF DESCRIPTION OF THE DRAWINGS

In order to more clearly illustrate the technical solutions in embodiments of the present application or in the prior art, the drawings required for description in the embodiments or the prior art will be briefly described, and apparently, the drawings described hereafter are some embodiments of the present application, and other drawings may be obtained by those skilled in the art without creative effort according to these accompanying drawings.

DESCRIPTION OF EMBODIMENTS

In order to make the objects, technical solutions and advantages of the embodiments of the present application clearer, the technical solutions of the embodiments of the present application will be clearly and completely described below with reference to the accompanying drawings in the embodiments of the present application. Apparently, the embodiments described here are just part rather than all of the embodiments of the present applications. All of the other embodiments obtained by those skilled in the art based on the embodiments of the present application without creative effort are within the scope of the present application.

Figure 1:
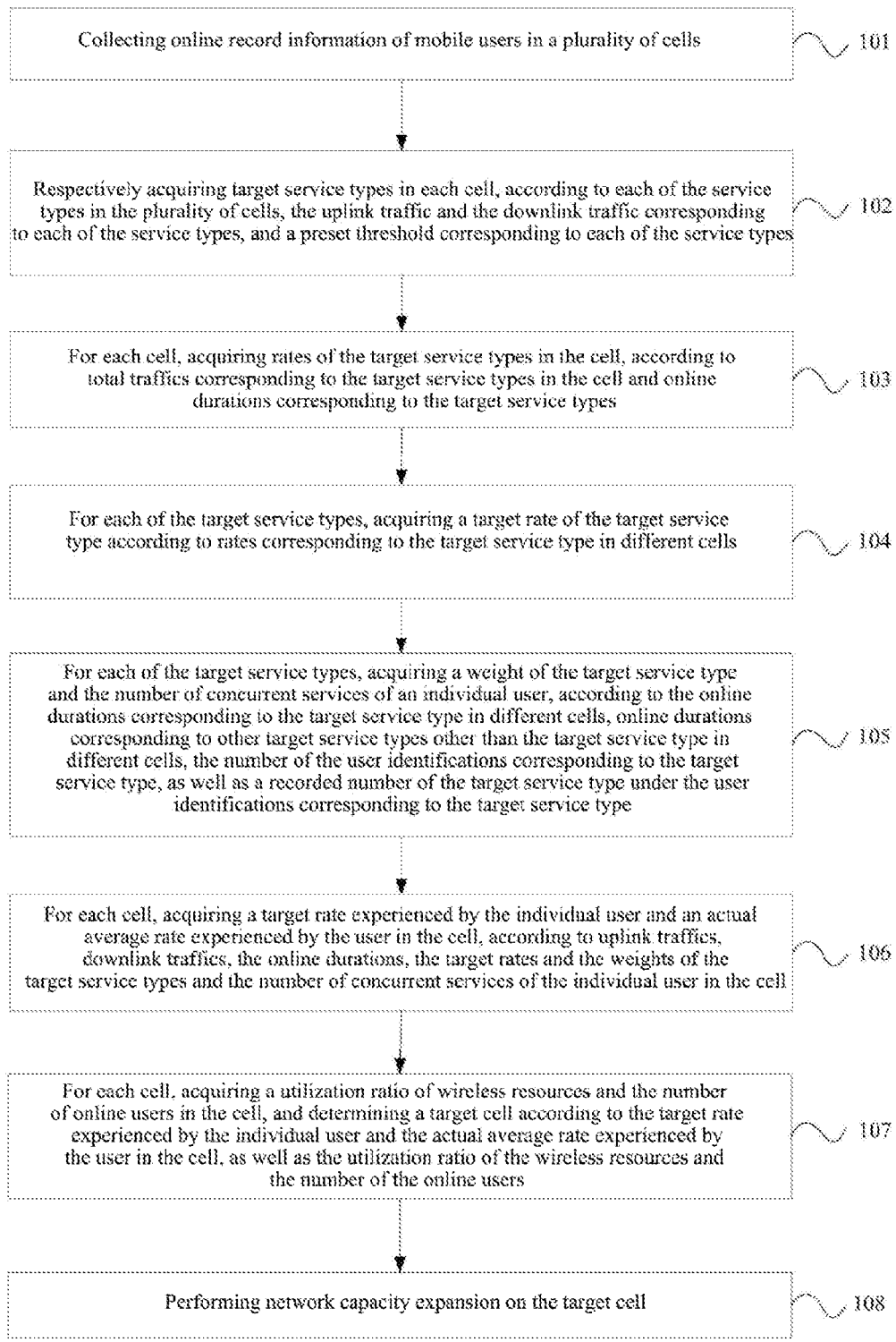
FIG. 1 is a flow diagram of embodiment 1 of a method for network capacity expansion provided by the present application.

FIG. 1 is a flow diagram of embodiment 1 of a method for network capacity expansion provided by the present application, and as shown in FIG. 1, the method includes:

Step 101, collecting online record information of mobile users in a plurality of cells, wherein, the online record information of the mobile users includes user identifications, service types corresponding to the user identifications, and uplink traffics, downlink traffics and online durations corresponding to the service types.

Step 102, respectively acquiring target service types in each cell, according to each of the service types in the plurality of cells, the uplink traffic and the downlink traffic corresponding to each of the service types, and a preset threshold corresponding to each of the service types.

Step 103, for each cell, acquiring rates of the target service types in the cell, according to total traffics corresponding to the target service types in the cell and online durations corresponding to the target service types.

Step 104, for each of the target service types, acquiring a target rate of the target service type according to rates corresponding to the target service type in different cells.

Step 105, for each of the target service types, acquiring a weight of the target service type and the number of concurrent services of an individual user, according to the online durations corresponding to the target service type in different cells, online durations corresponding to other target service types other than the target service type in different cells, the number of the user identifications corresponding to the target service type, as well as a recorded number of the target service type under the user identifications corresponding to the target service type.

Step 106, for each cell, acquiring a target rate experienced by the individual user and an actual average rate experienced by the user in the cell, according to uplink traffics, downlink traffics, the online durations, the target rates and the weights of the target service types and the number of concurrent services of the individual user in the cell.

Step 107, for each cell, acquiring a utilization ratio of wireless resources and the number of online users in the cell, and determining a target cell according to the target rate experienced by the individual user and the actual average rate experienced by the user in the cell, as well as the utilization ratio of the wireless resources and the number of the online users; wherein, the target rate experienced by the individual user in the target cell is larger than the actual average rate experienced by the user in the target cell, the utilization ratio of the wireless resources in the target cell is larger than a preset threshold, and the number of online users in the target cell is larger than a preset threshold; and Step 108, performing network capacity expansion on the target cell.

In this embodiment, the online record information of the mobile users in the plurality of cells is collected, wherein, the online record information of the mobile users includes user identifications, service types corresponding to the user identifications, and uplink traffic, downlink traffic and online durations corresponding to the service types; the target service types in each of the cells are respectively acquired, according to each of the service types in the plurality of cells, the uplink traffic and the downlink traffic corresponding to each of the service types as well as a preset threshold corresponding to each of the service types; for each cell, rates of the target service types in the cell are acquired according to total traffics corresponding to the target service types in the cell and the online durations of the target service types; for each of the target service types, a target rate of the target service type is acquired according to a rate corresponding to the target service type in different cells; for each of the target service types, a weight of the target service type and the number of concurrent services of an individual user are acquired according to the online durations corresponding to the target service type in different cells, online durations corresponding to other target service types other than the target service type in different cells, the number of the user identifications corresponding to the target service type, as well as a recorded number of the target service type under the user identifications corresponding to the target service type; for each cell, a target rate experienced by the individual user and an actual average rate experienced by the user in the cell are acquired, according to the uplink traffic, the downlink traffic, the online duration, the target rate and the weight of the target service types in the cell and the number of concurrent services of the individual user; for each cell, a utilization ratio of wireless resources and the number of online users in the cell are acquired, and a target cell is determined according to the target rate experienced by the individual user and the actual average rate experienced by the user in the cell, as well as the utilization ratio of the wireless resources and the number of the online users; wherein, the target rate experienced by the individual user in the target cell is larger than the actual average rate experienced by the user in the target cell, the utilization ratio of the wireless resources in the target cell is larger than a preset threshold, and the number of online users in the target cell is larger than a preset threshold; and the network capacity expansion is performed on the target cell, in such a way, according to the utilization ratio of wireless resources, the actual average rate experienced by the user and the target rate experienced by the individual user in the cell, a target cell can be determined and the network capacity expansion is performed on the target cell, thereby improving the user experience in the target cell, and meanwhile avoiding the problem of resource waste due to capacity expansion of cells with good user experience.

Figure 2:
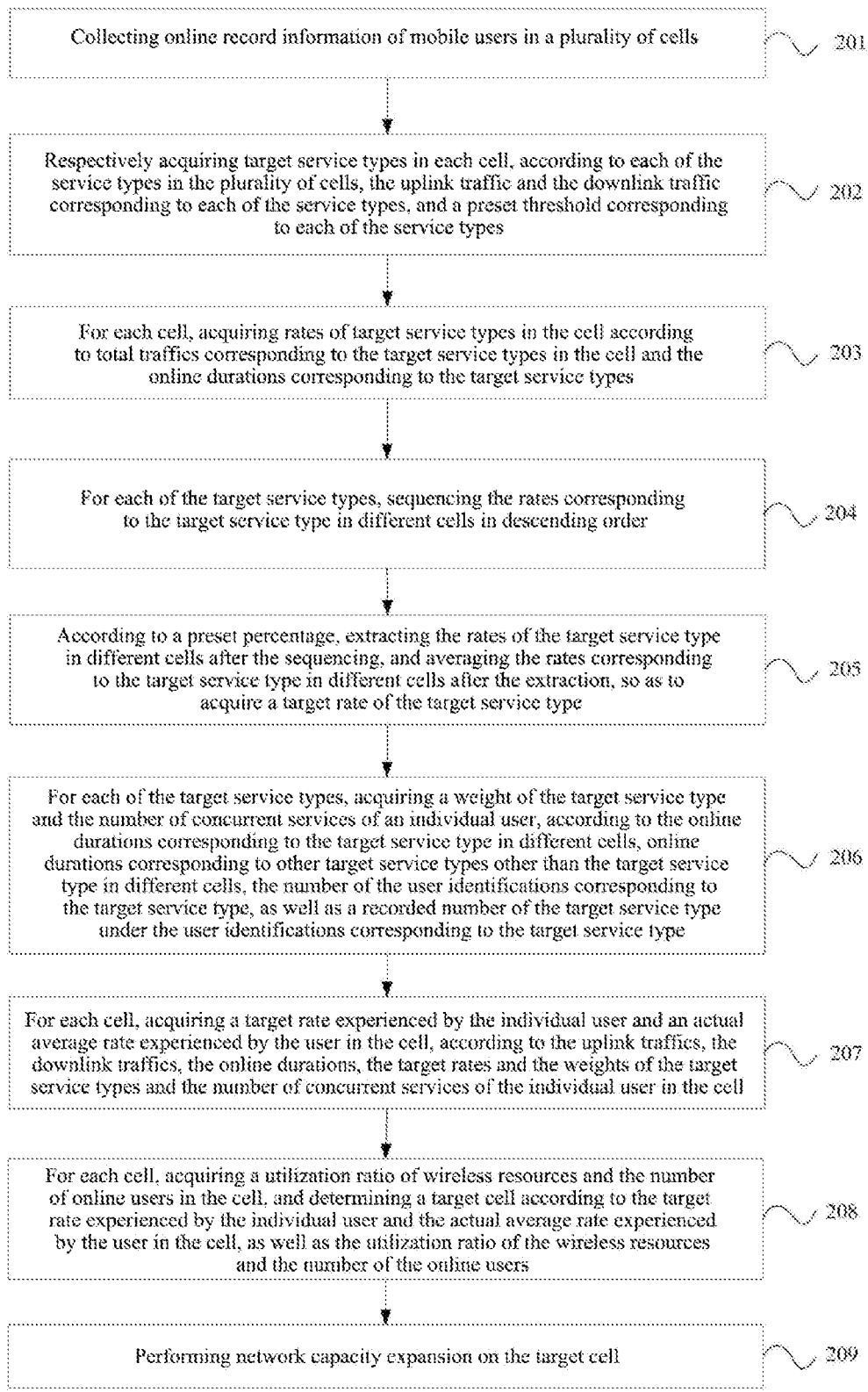
FIG. 2 is a flow diagram of embodiment 2 of the method for network capacity expansion provided by the present application.

FIG. 2 is a flow diagram of embodiment 2 of the method for network capacity expansion provided by the present application, and as shown in FIG. 2, the method includes:

Step 201, collecting online record information of mobile users in a plurality of cells, wherein, the online record information of the mobile users includes user identifications, service types corresponding to the user identifications, and uplink traffics, downlink traffics and online durations corresponding to the service types.

Step 202, respectively acquiring target service types in each cell, according to each of the service types in the plurality of cells, the uplink traffic and the downlink traffic corresponding to each of the service types, and a preset threshold corresponding to each of the service types.

Step 203, for each cell, acquiring rates of target service types in the cell according to total traffics corresponding to the target service types in the cell and the online durations corresponding to the target service types.

Step 204, for each of the target service types, sequencing the rates corresponding to the target service type in different cells in descending order.

Step 205, according to a preset percentage, extracting the rates of the target service type in different cells after the sequencing, and averaging the rates corresponding to the target service type in different cells after the extraction, so as to acquire a target rate of the target service type.

Step 206, for each of the target service types, acquiring a weight of the target service type and the number of concurrent services of an individual user, according to the online durations corresponding to the target service type in different cells, online durations corresponding to other target service types other than the target service type in different cells, the number of the user identifications corresponding to the target service type, as well as a recorded number of the target service type under the user identifications corresponding to the target service type.

Step 207, for each cell, acquiring a target rate experienced by the individual user and an actual average rate experienced by the user in the cell, according to the uplink traffics, the downlink traffics, the online durations, the target rates and the weights of the target service types and the number of concurrent services of the individual user in the cell.

Step 208, for each cell, acquiring a utilization ratio of wireless resources and the number of online users in the cell, and determining a target cell according to the target rate experienced by the individual user and the actual average rate experienced by the user in the cell, as well as the utilization ratio of the wireless resources and the number of the online users; wherein, the target rate experienced by the individual user in the target cell is larger than the actual average rate experienced by the user in the target cell, the utilization ratio of the wireless resources in the target cell is larger than a preset threshold, and the number of online users in the target cell is larger than a preset threshold.

Step 209, performing network capacity expansion on the target cell.

In this embodiment, by sequencing the rates of the target service types in different cells in the descending order for each of the target service types, extracting the rates corresponding to the target service types in different cells after the sequencing according to the preset percentage, and averaging the rates corresponding to the target service types in different cells after the extraction, the target rates of the target service types are acquired, so as to improve acquisition efficiency of target rates of the target service types.

Figure 3:
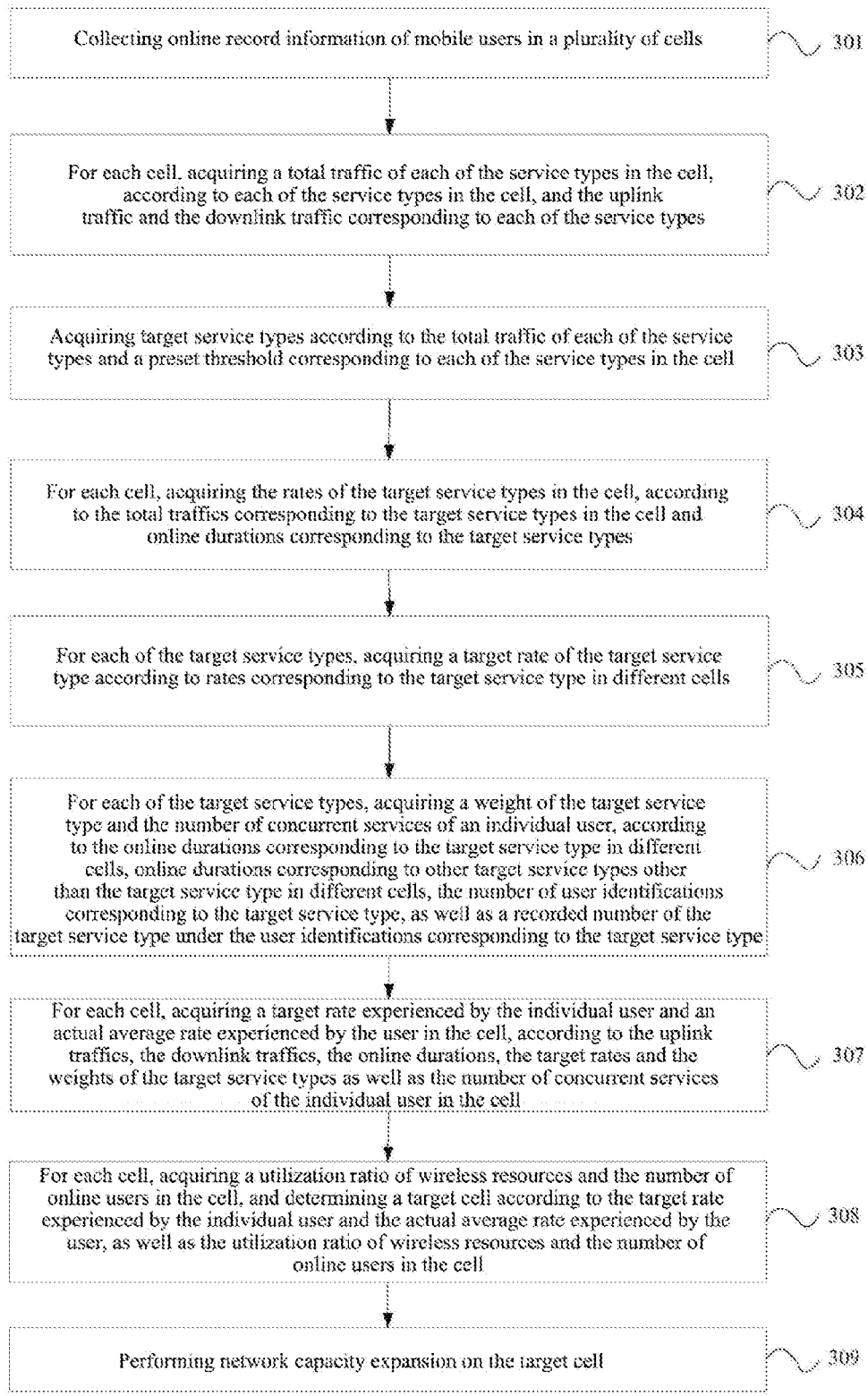
FIG. 3 is a flow diagram of embodiment 3 of the method for network capacity expansion provided by the present application.

FIG. 3 is a flow diagram of embodiment 3 of the method for network capacity expansion provided by the present application, and as shown in FIG. 3, the method includes:

Step 301, collecting online record information of mobile users in a plurality of cells, wherein, the online record information of the mobile users includes user identifications, service types corresponding to the user identifications, and uplink traffics, downlink traffics and online durations corresponding to the service types.

Step 302, for each cell, acquiring a total traffic of each of the service types in the cell, according to each of the service types in the cell, and the uplink traffic and the downlink traffic corresponding to each of the service types.

Step 303, acquiring target service types according to the total traffic of each of the service types in the cell and a preset threshold corresponding to each of the service types; wherein, the total traffics of the target service types are larger than the preset thresholds corresponding to the target service types.

Step 304, for each cell, acquiring the rates of the target service types in the cell, according to the total traffics corresponding to the target service types in the cell and online durations corresponding to the target service types.

Step 305, for each of the target service types, acquiring a target rate of the target service type according to rates corresponding to the target service type in different cells.

Step 306, for each of the target service types, acquiring a weight of the target service type and the number of concurrent services of an individual user, according to the online durations corresponding to the target service type in different cells, online durations corresponding to other target service types other than the target service type in different cells, the number of user identifications corresponding to the target service type, as well as a recorded number of the target service type under the user identifications corresponding to the target service type.

Step 307, for each cell, acquiring a target rate experienced by the individual user and an actual average rate experienced by the user in the cell, according to the uplink traffics, the downlink traffics, the online durations, the target rates and the weights of the target service types as well as the number of concurrent services of the individual user in the cell.

Step 308, for each cell, acquiring a utilization ratio of wireless resources and the number of online users in the cell, and determining a target cell according to the target rate experienced by the individual user and the actual average rate experienced by the user, as well as the utilization ratio of wireless resources and the number of online users in the cell; wherein, the target rate experienced by the individual user in the target cell is larger than the actual average rate experienced by the user in the target cell, and the utilization ratio of wireless resources in the target cell is larger than the preset threshold, and the number of online users in the target cell is larger than the preset threshold.

Step 309, performing network capacity expansion on the target cell.

In this embodiment, for each cell, by acquiring the total traffic of each of the service types in the cell, according to each of the service types as well as the uplink traffic and the downlink traffic corresponding to each of the service types in the cell; and acquiring the target service types according to the total traffic of each of the service types and a preset threshold corresponding to each of the service types in the cell; wherein, the total traffics of the target service types are larger than preset thresholds corresponding to the target service types, different target service types may be acquired according to practical application circumstances.

Figure 4:
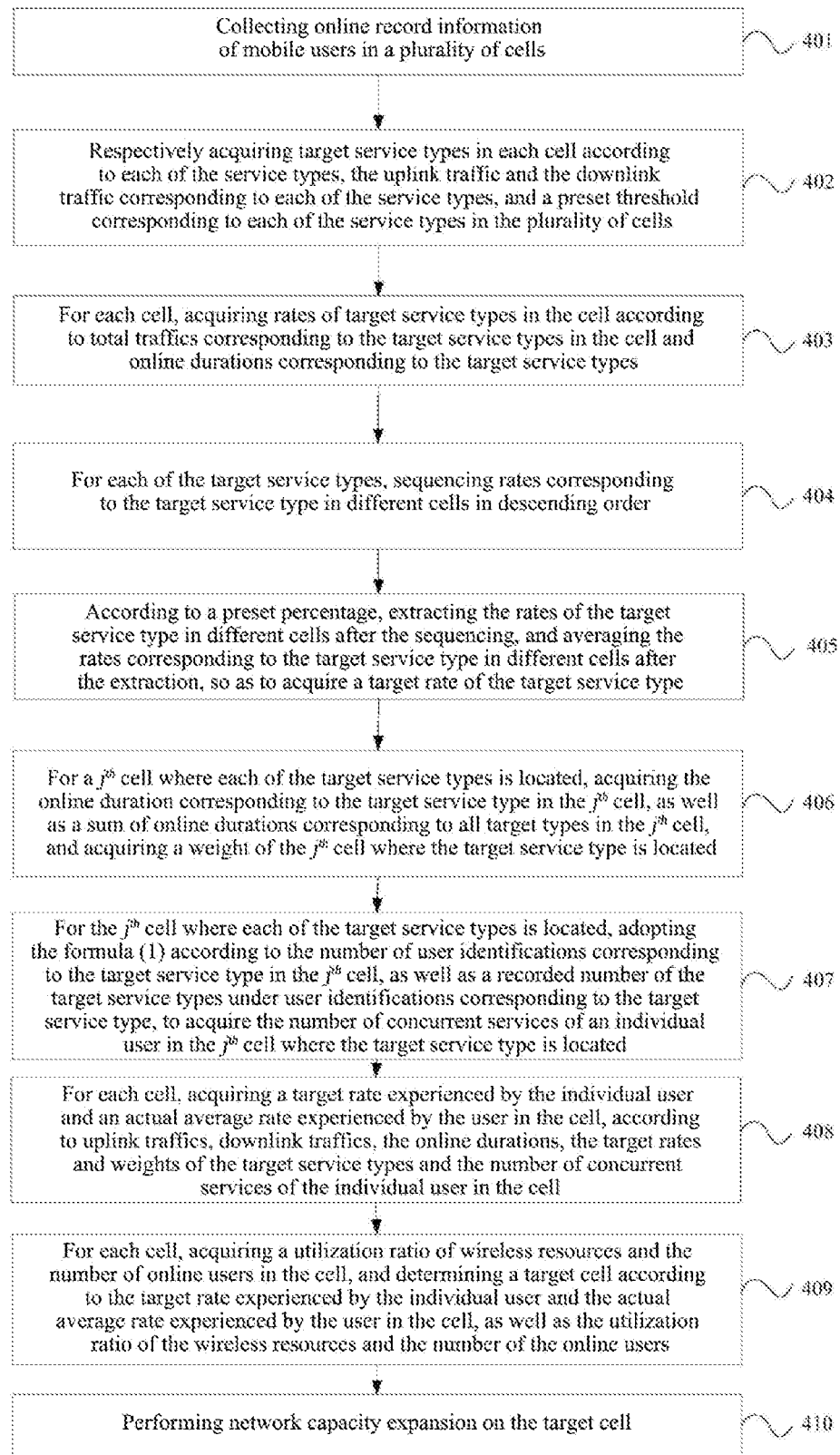
FIG. 4 is a flow diagram of embodiment 4 of the method for network capacity expansion provided by the present application.

FIG. 4 is a flow diagram of embodiment 4 of the method for network capacity expansion provided by the present application, and as shown in FIG. 4, the method includes:

Step 401, collecting online record information of mobile users in a plurality of cells, wherein, the online record information of the mobile users includes user identifications, service types corresponding to the user identifications, and uplink traffics, downlink traffics and online durations corresponding to the service types.

Step 402, respectively acquiring target service types in each cell according to each of the service types, the uplink traffic and the downlink traffic corresponding to each of the service types, and a preset threshold corresponding to each of the service types in the plurality of cells.

Step 403, for each cell, acquiring rates of target service types in the cell according to total traffics corresponding to the target service types in the cell and online durations corresponding to the target service types.

Step 404, for each of the target service types, sequencing rates corresponding to the target service type in different cells in descending order.

Step 405, according to a preset percentage, extracting the rates of the target service type in different cells after the sequencing, and averaging the rates corresponding to the target service type in different cells after the extraction, so as to acquire a target rate of the target service type.

Step 406, for a $j^{th}$ cell where each of the target service types is located, acquiring the online duration corresponding to the target service type in the $j^{th}$ cell, as well as a sum of online durations corresponding to all target types in the $j^{th}$ cell, and acquiring a weight of the $j^{th}$ cell where the target service type is located.

In this embodiment, the weight of the $j^{th}$ cell where the target service types are located is equal to the online durations corresponding to the target service types in the $j^{th}$ cell divided by the sum of the online durations corresponding to all target types in the $j^{th}$ cell.

Step 407, for the $j^{th}$ cell where each of the target service types is located, adopting the following formula (1) according to the number of user identifications corresponding to the target service type in the $j^{th}$ cell, as well as a recorded number of the target service types under user identifications corresponding to the target service type:

$$C_j = \sum_{i=1}^{n_j} \frac{N_{ij}}{M_{ij}} / n_j \qquad (1)$$

to acquire the number of concurrent services of an individual user in the $j^{th}$ cell where the target service type is located.

wherein, $C_j$ is the number of concurrent services of the individual user in the $j^{th}$ cell, $n_j$ is the total number of the target service types in the $j^{th}$ cell, $N_{ij}$ is a recorded number of $i^{th}$ target service type in the $j^{th}$ cell, $M_{ij}$ is the number of users using the $i^{th}$ target service type in the $j^{th}$ cell, and j is a positive integer.

Step 408, for each cell, acquiring a target rate experienced by the individual user and an actual average rate experienced by the user in the cell, according to uplink traffics, downlink traffics, the online durations, the target rates and weights of the target service types and the number of concurrent services of the individual user in the cell.

Step 409, for each cell, acquiring a utilization ratio of wireless resources and the number of online users in the cell, and determining a target cell according to the target rate experienced by the individual user and the actual average rate experienced by the user in the cell, as well as the utilization ratio of the wireless resources and the number of the online users; wherein, the target rate experienced by the individual user in the target cell is larger than the actual average rate experienced by the user in the target cell, the utilization ratio of the wireless resources in the target cell is larger than a preset threshold, and the number of online users in the target cell is larger than a preset threshold.

Step 410, performing network capacity expansion on the target cell.

In this embodiment, for a cell where each of the target service types is located, by acquiring online durations corresponding to the target service types in the cell and a sum of the online durations corresponding to all target types in the cell; and acquiring the weight of the cell where the target service types are located; for the cell where each of the target service types is located, acquiring the number of concurrent services of an individual user, according to the number of user identifications corresponding to the target service types in the cell, as well as the recorded number of the target service types under the user identifications corresponding to the target service types, thus the weight of the cell where the target service types are located is improved, and the efficiency of the number of concurrent services of the individual user in the cell is improved.

Figure 5:
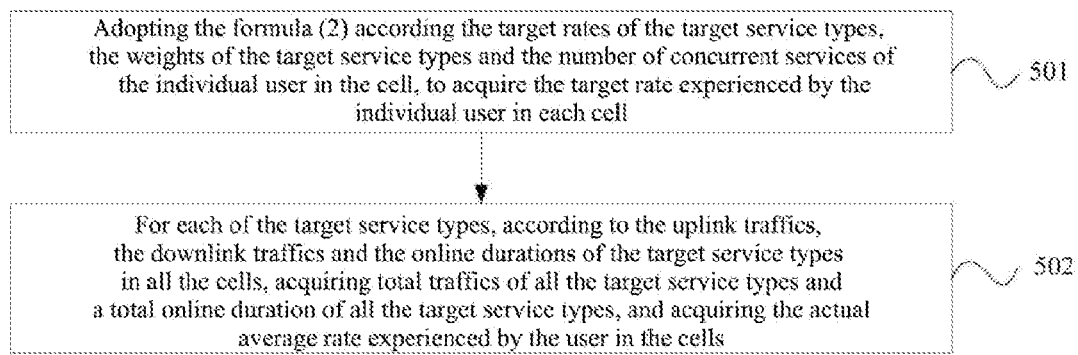
FIG. 5 is a flow diagram of embodiment 5 of the method for network capacity expansion provided by the present application.

FIG. 5 is a flow diagram of embodiment 5 of the method for network capacity expansion provided by the present application. Based on the embodiment illustrated in FIG. 4 and as shown in FIG. 5, in the method for network capacity expansion provided by embodiment 5 of the present application, for each cell, the acquiring the target rate experienced by the individual user and the actual average rate experienced by the user in the cell, according to the uplink traffics, the downlink traffics, the online durations, the target rates and the weights of the target service types as well as the number of concurrent services of the individual user in the cell in Step 408, includes:

Step 501, adopting the following formula (2) according the target rates of the target service types, the weights of the target service types and the number of concurrent services of the individual user in the cell:

$$V_{Oj} = \sum_{i=1}^{n_j} V_{ij} \times W_{ij} \times C_j \qquad (2)$$

to acquire the target rate experienced by the individual user in each cell, wherein, $V_{Oj}$ is the target rate experienced by the individual user in a $j^{th}$ cell, i is the service type, $V_{ij}$ is the target rate of an $i^{th}$ target service type in the $j^{th}$ cell, $W_{ij}$ is the weight of the $i^{th}$ target service type in the $j^{th}$ cell, $C_j$ is an average number of concurrent services of the individual user in the $j^{th}$ cell, $n_j$ is a total number of the target service types in the $j^{th}$ cell, and j is a positive integer.

Step 502, for each of the target service types, according to the uplink traffics, the downlink traffics and the online durations of the target service types in all the cells, acquiring total traffics of all the target service types and a total online duration of all the target service types, and acquiring the actual average rate experienced by the user in the cells.

In this embodiment, by acquiring the target rates of the target service types, the number of concurrent services of the individual user in each cell as well as the weight of the target service types in each cell, the target rate experienced by the individual user in each cell is acquired, so that, for each cell, the target cell is determined according to the utilization ratio of wireless resources and the number of online users in the cell, and according to the target rate experienced by the individual user and the actual average rate experienced by the user in the cell, thus improving the accuracy of determining the target cell.

Figure 6:
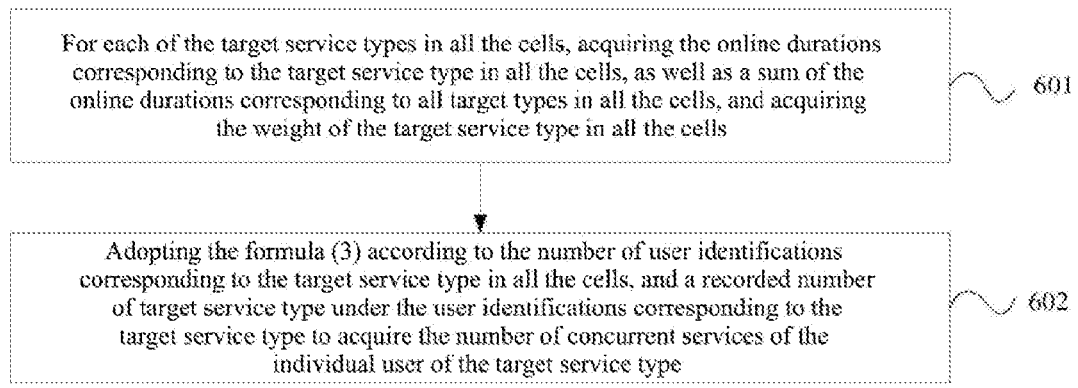
FIG. 6 is a flow diagram of embodiment 6 of the method for network capacity expansion provided by the present application.

FIG. 6 is a flow diagram of embodiment 6 of the method for network capacity expansion method provided by the present application. Based on the embodiment illustrated in FIG. 2 and as shown in FIG. 6, the method for network capacity expansion method provided by embodiment 6 of the present application, for each of the target service types, the acquiring the weight of the target service type and the number of concurrent services of the individual user, according to the online durations corresponding to the target service type in different cells, the online durations corresponding to other target service types other than the target service type in different cells, the number of user identifications corresponding to the target service type, as well as the recorded number of the target service type under the user identifications corresponding to the target service type in Step 206, includes:

Step 601, for each of the target service types in all the cells, acquiring the online durations corresponding to the target service type in all the cells, as well as a sum of the online durations corresponding to all target types in all the cells, and acquiring the weight of the target service type in all the cells.

Step 602, adopting the following formula (3) according to the number of user identifications corresponding to the target service type in all the cells, and a recorded number of target service type under the user identifications corresponding to the target service type:

$$C = \sum_{i=1}^{n} \frac{N_i}{M_i} / n \quad (3)$$

to acquire the number of concurrent services of the individual user of the target service type.

wherein, C is the number of concurrent services of the individual user of the target service type, n is a total number of the target service type in all the cells, $N_i$ is a recorded number of an $i^{th}$ target service type in all the cells, and $M_i$ is the number of users using the $i^{th}$ target service type in all the cells.

In this embodiment, for each of the target service types in all the cells, by acquiring the online durations corresponding to the target service type in all the cells as well as a sum of the online durations corresponding to all the target types in all the cells, and acquiring the weight of the target service type in all the cells; and acquiring the number of concurrent services of the individual users with the target service types, according to the number of user identifications corresponding to the target service type in all the cells as well as a recorded number of the target service type under the user identifications corresponding to the target service type, the efficiencies in acquiring the weight of the target service type and the number of concurrent services of the individual user are improved.

Figure 7:
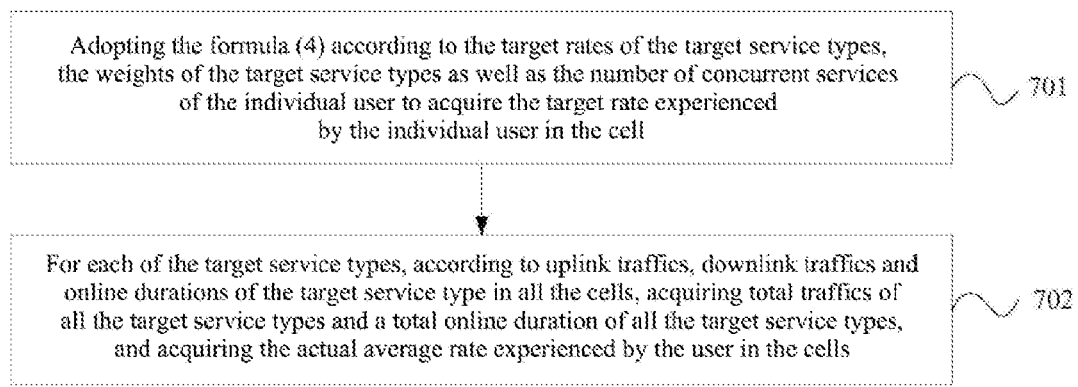
FIG. 7 is a flow diagram of embodiment 7 of the method for network capacity expansion provided by the present application.

FIG. 7 is a flow diagram of embodiment 7 of the method for network capacity expansion provided by the present application. Based on the embodiment illustrated in FIG. 6 and as shown in FIG. 7, in the method for network capacity expansion provide by embodiment 7 of the present application, for each cell, the acquiring the target rate experienced by the individual user and the actual average rate experienced by the user in the cell according to the uplink traffics, the downlink traffics, the online durations, the target rates and the weights of the target service types and the number of concurrent services of the individual user in the cell in Step 408, includes:

Step 701, acquiring the target rate experienced by the individual user in the cell, by adopting the following formula (4), according to the target rates of the target service types, the weights of the target service types as well as the number of concurrent services of the individual user:

$$V_O = \sum_{i=1}^{n} V_i \times W_i \times C \quad (4)$$

wherein, $V_O$ is the target rate experienced by the individual user in the cell, i is a positive integer, $V_i$ is the target rate of an $i^{th}$ target service type, $W_i$ is the weights of the $i^{th}$ target service type in all the cells, C is an average number of concurrent services of the individual user in all the cells, and n is the number of the target service types in all the cells.

Step 702, for each of the target service types, according to uplink traffics, downlink traffics and online durations of the target service type in all the cells, acquiring total traffics of all the target service types and a total online duration of all the target service types, and acquiring the actual average rate experienced by the user in the cells.

In this embodiment, by acquiring the target rates of the target service types, the number of concurrent services of the individual user in all the cells as well as the weight of the target service types in all the cells so as to acquire the target rate experienced by the individual user in the cell, the efficiency of acquiring the target rate experienced by the individual user in the cell is improved.

Figure 8:
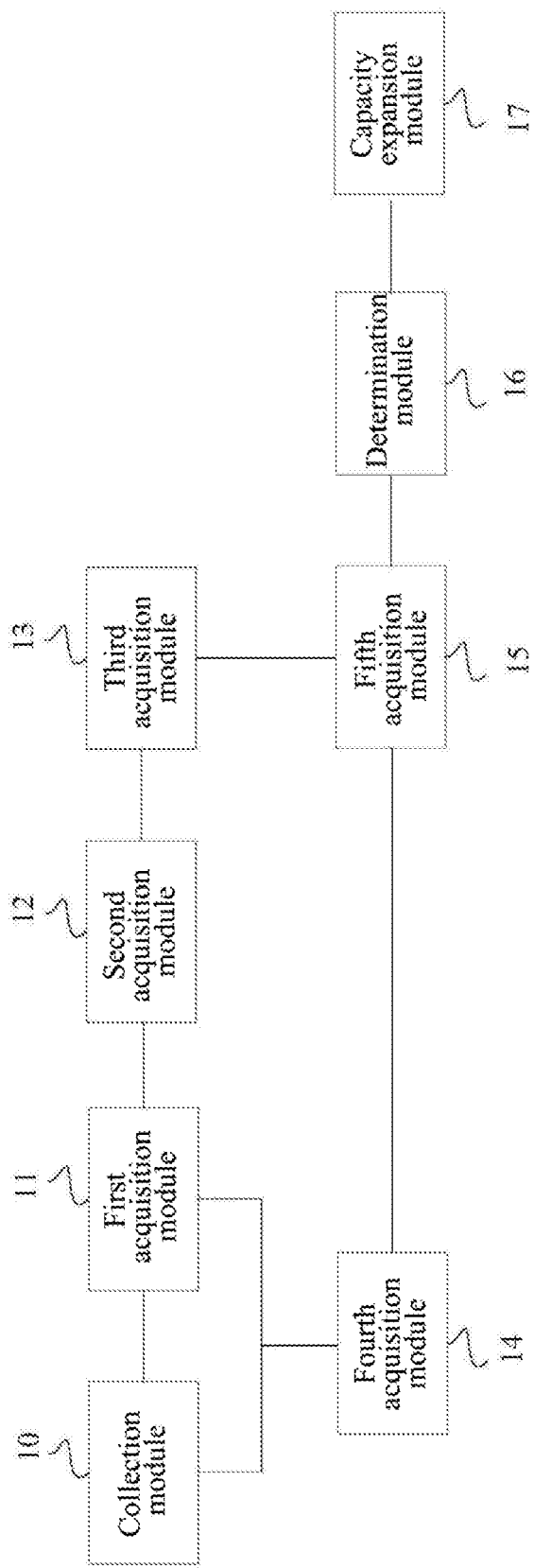
FIG. 8 is a structural diagram of embodiment 1 of an apparatus for network capacity expansion provided by the present application.

FIG. 8 is a structural diagram of embodiment 1 of an apparatus for network capacity expansion provided by the present application, as shown in FIG. 8, the apparatus includes: a collection module 10, a first acquisition module 11, a second acquisition module 12, a third acquisition module 13, a fourth acquisition module 14, a fifth acquisition module 15, a determination module 16 and a capacity expansion module 17.

The collection module 10 is configured to collect online record information of mobile users in a plurality of cells, wherein, the online record information of the mobile users includes user identifications, service types corresponding to the user identifications, and uplink traffics, downlink traffics and online durations corresponding to the service types.

The first acquisition module 11 is configured to respectively acquire target service types in each cell, according to each of the service types in the plurality of cells, the uplink traffic and the downlink traffic corresponding to each of the service types, and a preset threshold corresponding to each of the service types.

The second acquisition module 12, configured to acquire, for each cell, rates of the target service types in the cell, according to the total traffics corresponding to the target service types in the cell and the online durations corresponding to the target service types.

The third acquisition module 13, configured to acquire, for each of the target service types, a target rate of the target service type according to rates corresponding to the target service type in different cells.

The fourth acquisition module 14, configured to acquire, for each of the target service types, a weight of the target service type and the number of concurrent services of an individual user, according to the online durations corresponding to the target service type in different cells, online durations corresponding to other target service types other than the target service type in different cells, the number of the user identifications corresponding to the target service type, as well as a recorded number of the target service type under the user identifications corresponding to the target service type.

The fifth acquisition module 15, configured to acquire, for each cell, a target rate experienced by the individual user and an actual average rate experienced by the user in the cell, according to the uplink traffics, the downlink traffics, the online durations, the target rates and the weights of the target service types and the number of concurrent services of the individual user in the cell.

The determination module 16, configured to acquire, for each cell, a utilization ratio of wireless resources and the number of online users in the cell, and determine a target cell according to the target rate experienced by the individual user and the actual average rate experienced by the user, as well as the utilization ratio of wireless resources and the number of online users in the cell; wherein, the target rate experienced by the individual user in the target cell is larger than the actual average rate experienced by the user in the target cell, the utilization ratio of wireless resources in the target cell is larger than a preset threshold, and the number of online users in the target cell is larger than a preset threshold.

The capacity expansion module 17, configured to perform network capacity expansion on the target cell.

The apparatus for network capacity expansion in this embodiment can implement the technical solution of the embodiment of the method illustrated in FIG. 1, and the realization principle and beneficial effects thereof are similar with those as described above, which will not be repeated herein.

Figure 9:
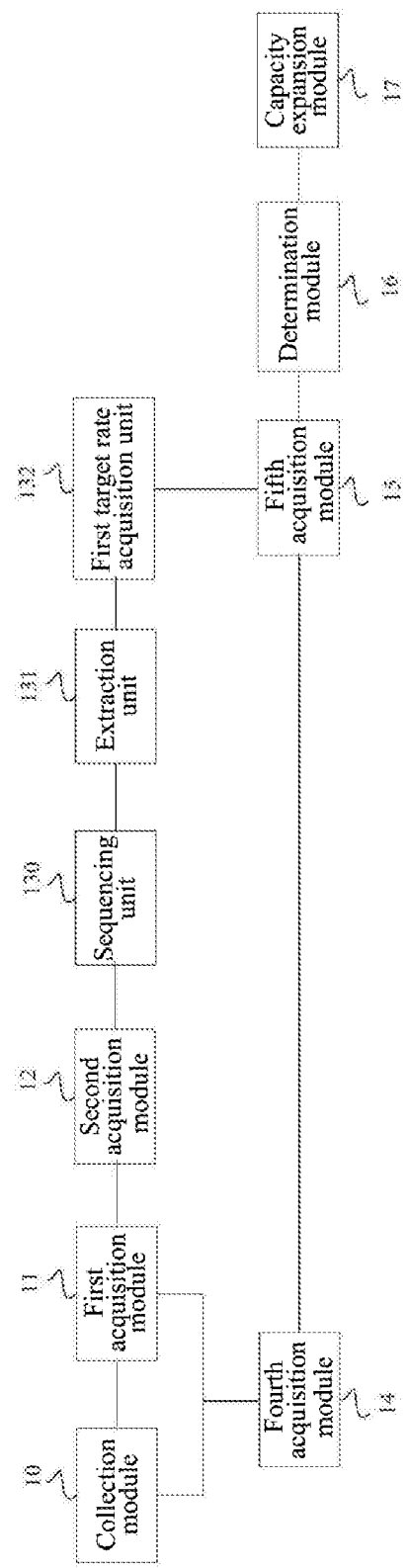
FIG. 9 is a structural diagram of embodiment 2 of the apparatus for network capacity expansion provided by the present application.

FIG. 9 is a structural diagram of embodiment 2 of the apparatus for network capacity expansion provided by the present application. As shown in FIG. 9 and on the basis of the above embodiment 1, the third acquisition module 13 includes:

a sequencing unit 130, configured to sequence, for each of the target service types, the rates corresponding to the target service type in different cells in descending order.

an extraction unit 131, configured to extract the rates of the target service type in different cells after the sequencing according to a preset percentage.

a first target rate acquisition unit 132, configured to average the rates corresponding to the target service type in different cells after the extraction, so as to acquire a target rate of the target service type.

The apparatus for network capacity expansion in this embodiment can implement the technical solution of the embodiment of the method illustrated in FIG. 2, and the realization principle and beneficial effects thereof are similar with those as described above, which will not be repeated herein.

Figure 10:
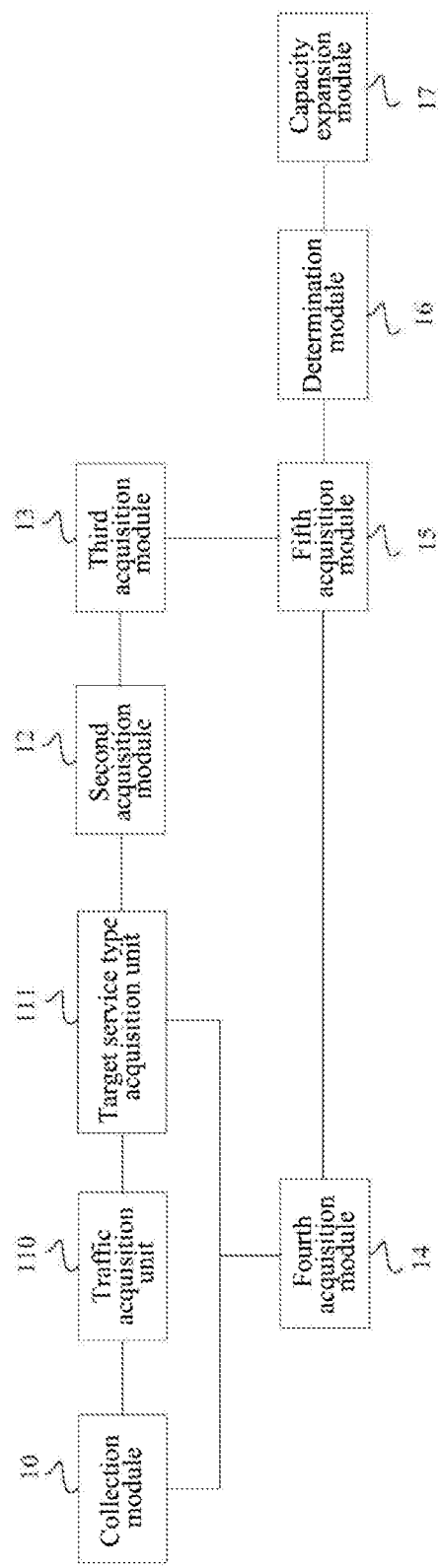
FIG. 10 is a structural diagram of embodiment 3 of the apparatus for network capacity expansion provided by the present application.

FIG. 10 is a structural diagram of embodiment 3 of the apparatus for network capacity expansion provided by the present application. As shown in FIG. 10 and based on embodiment 1, the first acquisition module 11 includes:

a traffic acquisition unit 110, configured to acquire, for each cell, a total traffic of each of the service types in the cell according to each of the service types in the cell, and the uplink traffic and the downlink traffic corresponding to each of the service types.

a target service type acquisition unit 111, configured to acquire target service types according to the total traffic of each of the service types in the cell and a preset threshold corresponding to each of the service types; wherein, the total traffics of the target service types are larger than the preset thresholds corresponding to the target service types.

The apparatus for network capacity expansion in this embodiment can implement the technical solutions of the embodiment of the method illustrated in FIG. 3, and the realization principle and beneficial effects thereof are similar with those as described above, which will not be repeated herein.

Figure 11:
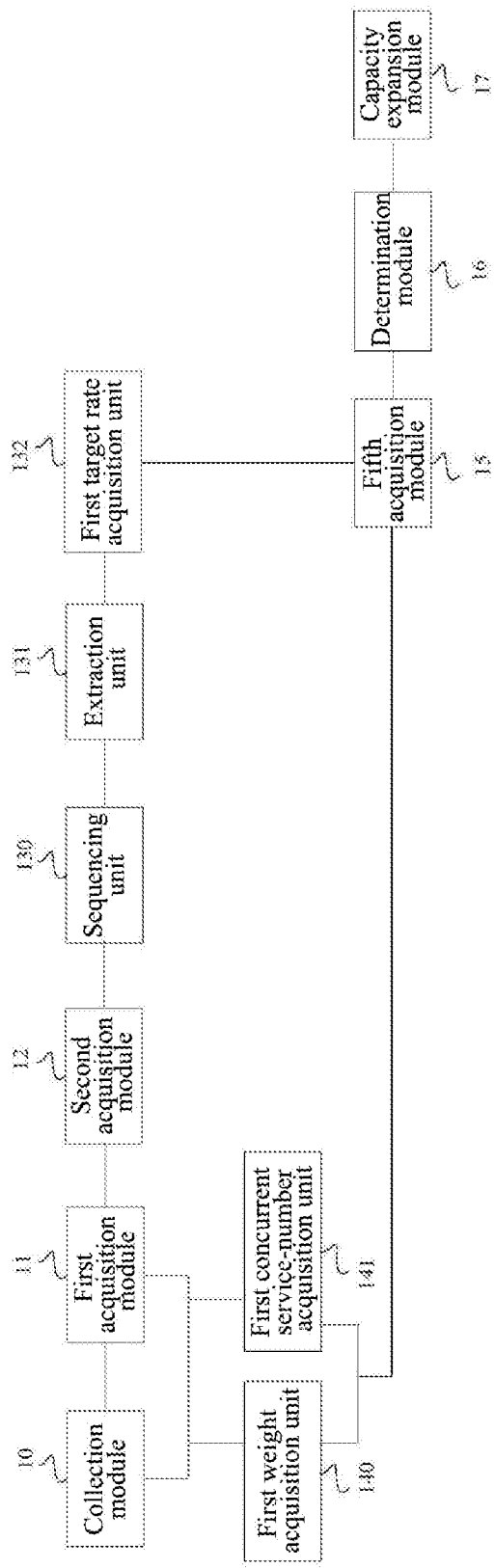
FIG. 11 is a structural diagram of embodiment 4 of the apparatus for network capacity expansion provided by the present application.

FIG. 11 is a structural diagram of embodiment 4 of the apparatus for network capacity expansion provided by the present application. As shown in FIG. 11 and on the basis of embodiment 2, the fourth acquisition module 14 includes:

a first weight acquisition unit 140, configured to acquire, for a $j^{th}$ cell where each of the target service types is located, online durations corresponding to the target service types in the $j^{th}$ cell, and a sum of online durations corresponding to all target types in the $j^{th}$ cell, and to acquire a weight of the $j^{th}$ cell where the target service types are located.

a first concurrent-service-number acquisition unit 141, configured to adopt, for the $j^{th}$ cell where each of the target service types is located, formula (1), according to the number of user identifications corresponding to the target service types in the $j^{th}$ cell, as well as a recorded number of the target service types under the user identifications corresponding to the target service types:

$$C_j = \sum_{i=1}^{n_j} \frac{N_{ij}}{M_{ij}} / n_j \qquad (1)$$

to acquire the number of concurrent services of an individual user in the $j^{th}$ cell where the target service type is located.

wherein, $C_j$ is the number of concurrent services of the individual user in the $j^{th}$ cell, $n_j$ is a total number of the target service types in the $j^{th}$ cell, $N_{ij}$ is a recorded number of an $i^{th}$ target service type in the $j^{th}$ cell, $M_{ij}$ is the number of users using the $i^{th}$ target service type in the $j^{th}$ cell, and j is a positive integer.

The apparatus for network capacity expansion in this embodiment can implement the technical solutions of the embodiment of the method illustrated in FIG. 4, and the realization principle and beneficial effects thereof are similar with those as described above, which will not be repeated herein.

Figure 12:
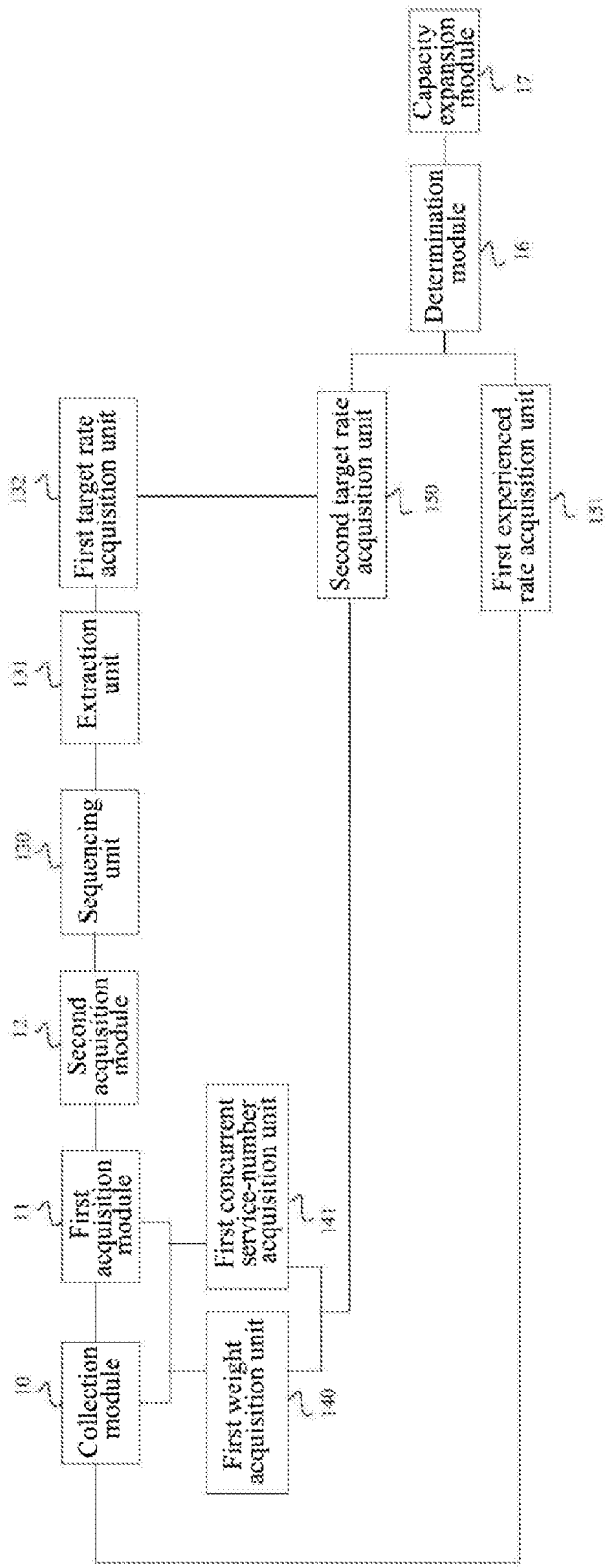
FIG. 12 is a structural diagram of embodiment 5 of the apparatus for network capacity expansion provided by the present application.

FIG. 12 is a structural diagram of embodiment 5 of the apparatus for network capacity expansion provided by the present application. As shown in FIG. 12 and on the basis of embodiment 4, the fifth acquisition module 15 includes:

a second target rate acquisition unit 150, configured to adopt formula (2) according to the target rates of target service types, the weight of the target service types, as well as the number of concurrent services of the individual user in the cell:

$$V_{Oj} = \sum_{i=1}^{n_j} V_{ij} \times W_{ij} \times C_j \qquad (2)$$

to acquire the target rate experienced by the individual user in each cell, wherein, $V_{Oj}$ is the target rate experienced by the individual user in a $j^{th}$ cell, i is the service type, $V_{ij}$ is the target rate of an $i^{th}$ target service type in the $j^{th}$ cell, $W_{ij}$ is the weight of the $i^{th}$ target service type in the $j^{th}$ cell, $C_j$ is an average number of concurrent services of the individual user in the $j^{th}$ cell, $n_j$ is a total number of the target service types in the $j^{th}$ cell, and j is a positive integer;

a first experienced-rate acquisition unit 151, configured to, for each of the target service types, according to the uplink traffics, the downlink traffics and the online durations of the target service types in all the cells, acquire total traffics of all the target service types and a total online duration of all the target service types, and to acquire the actual average rate experienced by the user in the cells.

The apparatus for network capacity expansion in this embodiment can implement the technical solutions of the embodiment of the method illustrated in FIG. 5, and the realization principle and beneficial effects thereof are similar with those as described above, which will not be repeated herein.

Figure 13:
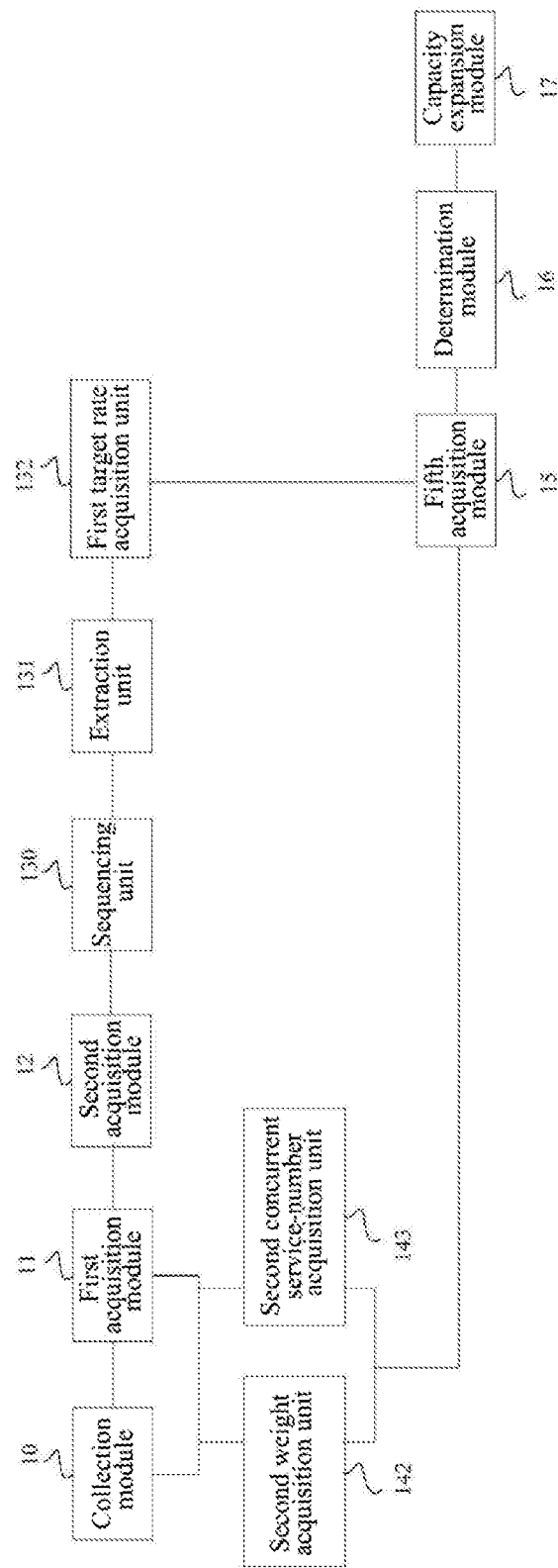
FIG. 13 is a structural diagram of embodiment 6 of the apparatus for network capacity expansion provided by the present application.

FIG. 13 is a structural diagram of embodiment 6 of the apparatus for network capacity expansion provided by the present application. As shown in FIG. 13 and on the basis of embodiment 2, the fourth acquisition module 14 includes:

a second weight acquisition unit 142, configured to, for each of the target service types in all the cells, acquire the online durations corresponding to the target service type in all the cells, as well as a sum of the online durations corresponding to all target types in all the cells, and to acquire the weight of the target service types in all the cells.

a second concurrent-service-number acquisition unit 143, configured to adopt formula (3) according to the number of user identifications corresponding to the target service type in all the cells, and a recorded number of the target service type under the user identifications corresponding to the target service type:

$$C = \sum_{i=1}^{n} \frac{N_i}{M_i} / n \quad (3)$$

to acquire the number of concurrent services of the individual user of the target service type.

wherein, C is the number of concurrent services of the individual user of the target service type, n is the total number of the target service type in all the cells, $N_i$ is a recorded number of an $i^{th}$ target service type in all the cells, and $M_i$ is the number of users using the $i^{th}$ target service type in all the cells.

The apparatus for network capacity expansion in this embodiment can implement technical solutions of the embodiment of the method illustrated in FIG. 6, and the realization principle and beneficial effects thereof are similar with those as described above, which will not be repeated herein.

Figure 14:
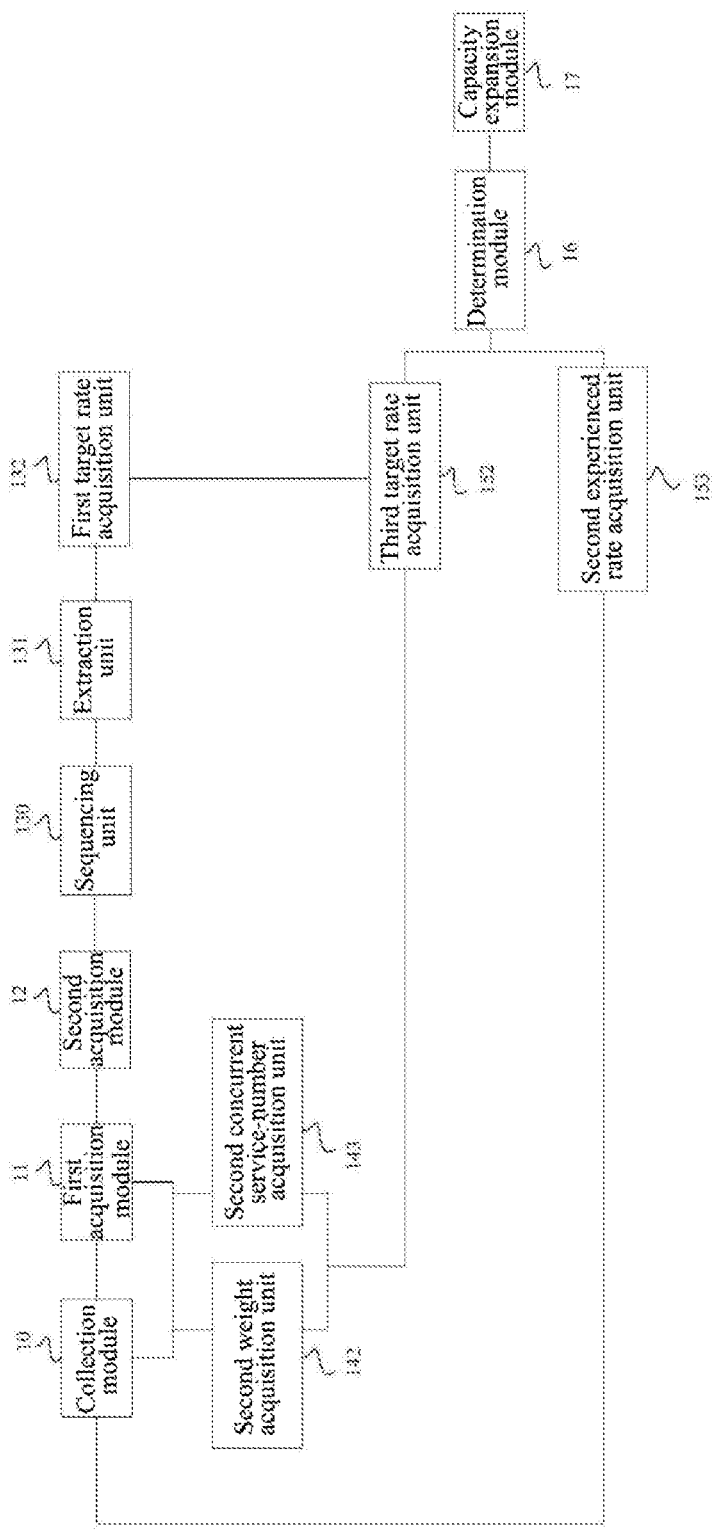
FIG. 14 is a structural diagram of embodiment 7 of the apparatus for network capacity expansion provided by the present application.

FIG. 14 is a structural diagram of embodiment 7 of the apparatus for network capacity expansion provided by the present application. As shown in FIG. 14 and on the basis of embodiment 6, the fifth acquisition module 15 includes:

a third target rate acquisition unit 152, configured to acquire the target rate experienced by the individual user in the cell, by adopting formula (4), according to the target rate of the target service type, the weight of the target service type as well as the number of concurrent services of the individual user:

$$V_O = \sum_{i=1}^{n} V_i \times W_i \times C \quad (4)$$

wherein, $V_O$ is the target rate experienced by the individual user in the cell, i is a positive integer, $V_i$ is the target rate of the $i^{th}$ target service type, $W_i$ is the weight of the $i^{th}$ target service type in all the cells, C is an average number of concurrent services of the individual user in all the cells, and n is the number of the target service types in all the cells.

a second experienced rate acquisition unit 153, configured to, for each of the target service types, according to the uplink traffics, the downlink traffics and the online durations of the target service type in all the cells, acquire the total traffics of all target service types and a total online duration of all the target service types, and to acquire the actual average rate experienced by the user in the cell.

The apparatus for network capacity expansion in this embodiment can implement the technical solutions of the embodiment of the method illustrated in FIG. 7, and the realization principle and beneficial effects thereof are similar with those as described above, which will not be repeated herein.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to technical solutions described in the foregoing embodiments, or make equivalent replacements to some or all technical features therein; however, these modifications or replacements do not make the essence of corresponding technical solutions depart from the scope of the technical solutions in the embodiments of the present application.

What is claimed is:

1. A method for network capacity expansion, comprising:
collecting online record information of mobile users in a plurality of cells, wherein, the online record information of the mobile users comprises user identifications, service types corresponding to the user identifications, and uplink traffics, downlink traffics and online durations corresponding to the service types;
respectively acquiring target service types in each of the plurality of cells, according to each of the service types in the plurality of cells, an uplink traffic and a downlink traffic corresponding to each of the service types and a preset threshold corresponding to each of the service types;
acquiring rates of the target service types in each of the plurality of cells according to total traffics corresponding to the target service types in each of the plurality of cells and the online durations of the target service types;
acquiring a target rate of each of the target service types according to the rates corresponding to each of the target service types in different cells;
acquiring a weight of each of the target service types and a first number of concurrent services of an individual user, according to the online durations corresponding to the target service types in different cells, a second number of the user identifications corresponding to the target service type, and a recorded number of each of the target service types under the user identifications corresponding to the target service type;
acquiring a target rate experienced by the individual user and an actual average rate experienced by the individual user in each of the plurality of cells, according to uplink traffics, downlink traffics, the online durations, the target rates and the weights of the target service types and the first number of concurrent services of the individual user in each of the plurality of cells;
acquiring a utilization ratio of wireless resources and a third number of online users in each of the plurality of cells, and determining a target cell according to the target rate experienced by the individual user and the actual average rate experienced by the individual user in each of the plurality of cells, as well as the utilization ratio of the wireless resources and the third number of the online users; wherein, the target rate experienced by the individual user in the target cell is larger than the actual average rate experienced by the individual user in the target cell, the utilization ratio of the wireless resources in the target cell is larger than a preset threshold, and the third number of online users in the target cell is larger than a preset threshold; and performing the network capacity expansion on the target cell.

2. The method according to claim 1, wherein, the acquiring the target rate of each of the target service types according to the rates corresponding to each of the target service types in different cells, comprises:

sequencing the rates corresponding to each of the target service types in different cells in descending order;

according to a preset percentage, extracting the rates of each of the target service types in different cells after the sequencing, and averaging the rates corresponding to each of the target service types in different cells after the extraction, so as to acquire the target rate of the target service type.

3. The method according to claim 1, wherein, the respectively acquiring the target service types in each of the plurality of cells, according to each of the service types in the plurality of cells, the uplink traffic and the downlink traffic corresponding to each of the service types as well as a preset threshold corresponding to each of the service types, comprises:

acquiring a total traffic of each of the service types in each of the plurality of cells, according to each of the service types in each of the plurality of cells, and the uplink traffic and the downlink traffic corresponding to each of the service types; and acquiring the target service types according to the total traffic of each of the service types in each of the plurality of cells and the preset threshold corresponding to each of the service types; wherein, the total traffics of the target service types are larger than the preset thresholds corresponding to the target service types.

4. The method according to claim 2, wherein, the acquiring the weight of each of the target service types and the first number of concurrent services of the individual user, according to the online durations corresponding to the target service types in different cells, the second number of the user identifications corresponding to the target service type, as well as a recorded number of each of the target service types under the user identifications corresponding to the target service type, comprises:

for a $j^{th}$ cell where each of the target service types is located, acquiring the online duration corresponding to each of the target service types in the $j^{th}$ cell and a sum of the online durations corresponding to all target types in the $j^{th}$ cell, and acquiring the weight of the $j^{th}$ cell where each of the target service types is located;

acquiring the first number of concurrent services of the individual user in the $j^{th}$ cell where each of the target service types is located, by adopting a formula $$C_j = \sum_{i=1}^{n_j} \frac{N_{ij}}{M_{ij}} \Big/ n_j,$$

for the $j^{th}$ cell where each of the target service types is located, according to the second number of the user identifications corresponding to each of the target service types in the $j^{th}$ cell, as well as the recorded number of the target service types under the user identifications corresponding to the target service type;

wherein, $C_j$ is the first number of concurrent services of the individual user in the $j^{th}$ cell, $n_j$ is the total number of the target service types in the $j^{th}$ cell, $N_{ij}$ is a recorded number of $i^{th}$ target service type in the $j^{th}$ cell, $M_{ij}$ is the number of users using the $i^{th}$ target service type in the $j^{th}$ cell, and j is a positive integer.

5. The method according to claim 4, wherein, the acquiring the target rate experienced by the individual user and the actual average rate experienced by the individual user in each of the plurality of cells, according to the uplink traffics, the downlink traffics, the online durations, the target rates and the weights of the target service types and the first number of concurrent services of the individual user in each of the plurality of cells, comprises:

acquiring the target rate experienced by the individual user in each of the plurality of cells, by adopting the formula $$V_{Oj} = \sum_{i=1}^{n_j} V_{ij} \times W_{ij} \times C_j,$$

according to the target rates of the target service types, the weights of the target service types, and the first number of concurrent services of the individual user in each of the plurality of cells, wherein, $V_{Oj}$ is the target rate experienced by the individual user in the $j^{th}$ cell, i is the service type, $V_{ij}$ the target rate of the $i^{th}$ target service type in the $j^{th}$ cell, $W_{ij}$ is the weight of the $i^{th}$ target service type in the $j^{th}$ cell, $C_j$ is an average number of concurrent services of the individual user in the $j^{th}$ cell, $n_j$ is a total number of the target service types in the $j^{th}$ cell, and j is a positive integer;

according to the uplink traffics, the downlink traffics and the online durations of the target service types in all the plurality of cells, acquiring total traffics of all the target service types and a total online duration of all the target service types, and acquiring the actual average rate experienced by the individual user in the plurality of cells.

6. The method according to claim 3, wherein, the acquiring the weight of each of the target service types and the first number of concurrent services of the individual user according to the online durations corresponding to the target service types in different cells, the second number of the user identifications corresponding to the target service type, and the recorded number of each of the target service types under the user identifications corresponding to the target service type, comprises:

for each of the target service types in all the plurality of cells, acquiring the online durations corresponding to each of the target service types in all the plurality of cells as well as a sum of the online durations corresponding to all the target types in all the plurality of cells, and acquiring the weight of the target service types in all the plurality of cells;

acquiring the first number of concurrent services of the individual user of each of the target service types by adopting the formula $$C = \sum_{i=1}^{n} \frac{N_i}{M_i} \Big/ n,$$

according to the second number of the user identifications corresponding to each of the target service types in all the plurality of cells, and the recorded number of each of the target service types under the user identifications corresponding to the target service type;

wherein, C is the first number of concurrent services of the individual user of the target service type, n is the total number of each of the target service types in all the plurality of cells, $N_i$ is the recorded number of an $i^{th}$ target service type in all the plurality of cells, and $M_i$ is the number of users using the $i^{th}$ target service type used in all the plurality of cells.

7. The method according to claim 6, wherein, the acquiring the target rate experienced by the individual user and the actual average rate experienced by the individual user in each of the plurality of cells, according to the uplink traffics, the downlink traffics, the online durations, the target rates and the weights of the target service types and the first number of concurrent services of the individual user in each of the plurality of cells, comprises:

acquiring the target rate experienced by the individual user in each of the plurality of cells, according to the target rates of the target service types, the weights of the target service types as well as the first number of concurrent services of the individual user by adopting the formula $$V_O = \sum_{i=1}^{n} V_i \times W_i \times C,$$

wherein, $V_O$ is the target rate experienced by the individual user in each of the plurality of cells, i is a positive integer, $V_i$ is the target rate of the $i^{th}$ target service type, $W_i$ is the weights of the $i^{th}$ target service type in all the plurality of cells, C is an average number of concurrent services of the individual user in all the plurality of cells, and n is the number of the target service types in all the plurality of cells;

according to the uplink traffics, the downlink traffics and the online durations of each of the target service types in all the plurality of cells, acquiring the total traffics of all the target service types and a total online duration of all the target service types, and acquiring the actual average rate experienced by the individual user in the plurality of cells.

8. An apparatus for network capacity expansion, comprises a processor and a computer-readable medium for storing program codes, which, when executed by the processor, cause the processor to:

collect online record information of mobile users in a plurality of cells, wherein, the online record information of the mobile users comprises user identifications, service types corresponding to the user identifications, and uplink traffics, downlink traffics and online durations corresponding to the service types;

respectively acquire target service types in each of the plurality of cells, according to each of the service types in the plurality of cells, an uplink traffic and a downlink traffic corresponding to each of the service types and a preset threshold corresponding to each of the service types;

acquire rates of the target service types in each of the plurality of cells, according to total traffics corresponding to the target service types in each of the plurality of cells and the online durations of the target service types;

acquire a target rate of each of the target service types according to the rates corresponding to each of the target service types in different cells;

acquire a weight of each of the target service types and a first number of concurrent services of an individual user, according to the online durations corresponding to the target service types in different cells, a second number of the user identifications corresponding to the target service type, and a recorded number of each of the target service types under the user identifications corresponding to the target service type;

acquire a target rate experienced by the individual user and an actual average rate experienced by the individual user in each of the plurality of cells, according to uplink traffics, downlink traffics, the online durations, the target rates and the weights of the target service types and the first number of concurrent services of the individual user in each of the plurality of cells;

acquire a utilization ratio of wireless resources and a third number of online users in each of the plurality of cells, and determining a target cell according to the target rate experienced by the individual user and the actual average rate experienced by the individual user in each of the plurality of cells, as well as the utilization ratio of the wireless resources and the third number of online users; wherein, the target rate experienced by the individual user in the target cell is larger than the actual average rate experienced by the individual user in the target cell, and the utilization ratio of the wireless resources in the target cell is larger than a preset threshold, and the third number of online users in the target cell is larger than the preset threshold; and perform network capacity expansion on the target cell.

9. The apparatus according to claim 8, wherein the program codes further cause the processor to:

sequence the rates corresponding to each of the target service types in different cells in descending order;

extract the rates of the target service types in different cells after the sequencing according to a preset percentage; and average the rates corresponding to the target service types in different cells after the extraction, so as to acquire the target rate of the target service type.

10. The apparatus according to claim 8, wherein the program codes further cause the processor to:

acquire a total traffic of each of the service types in each of the plurality of cells, according to each of the service types in each of the plurality of cells, and the uplink traffic and the downlink traffic corresponding to each of the service types;

acquire the target service types according to the total traffic of each of the service types in each of the plurality of cells and the preset threshold corresponding to each of the service types; wherein, the total traffics of the target service types are larger than the preset thresholds corresponding to the target service types.

11. The apparatus according to claim 9, wherein the program codes further cause the processor to:

for a $j^{th}$ cell where each of the target service types is located, acquire the online duration corresponding to each of the target service types in the $j^{th}$ cell and a sum of the online durations corresponding to all target types in the $j^{th}$ cell, and acquire the weight of the $j^{th}$ cell where each of the target service types is located; and acquire the first number of concurrent services of the individual user in the $j^{th}$ cell where each of the target service types is located, by adopting a formula $$C_j = \sum_{i=1}^{n_j} \frac{N_{ij}}{M_{ij}} \bigg/ n_j,$$

for the $j^{th}$ cell where each of the target service types is located, according to the second number of the user identifications corresponding to each of the target service types in the $j^{th}$ cell, as well as the recorded number of the target service types under the user identifications corresponding to the target service type;

wherein, $C_j$ is the first number of concurrent services of the individual user in the $j^{th}$ cell, $n_j$ is the total number of the target service types in the $j^{th}$ cell, $N_{ij}$ is a recorded number of $i^{th}$ target service type in the $j^{th}$ cell, $M_{ij}$ is the number of users using the $i^{th}$ target service type in the $j^{th}$ cell, and j is a positive integer.

12. The apparatus according to claim 11, wherein the program codes further cause the processor to:

acquire the target rate experienced by the individual user in each of the plurality of cells, by adopting the formula $$V_{Oj} = \sum_{i=1}^{n_j} V_{ij} \times W_{ij} \times C_j,$$

according to the target rates of the target service types, the weights of the target service types, and the first number of concurrent services of the individual user in each of the plurality of cells, wherein, $V_{Oj}$ is the target rate experienced by the individual user in the $j^{th}$ cell, i is the service type, $V_{ij}$ is the target rate of the $i^{th}$ target service type in the $j^{th}$ cell, $W_{ij}$ is the weight of the $i^{th}$ target service type in the $j^{th}$ cell, $C_j$ is an average number of concurrent services of the individual user in the $j^{th}$ cell, $n_j$ is a total number of the target service types in the $j^{th}$ cell, and j is a positive integer; and according to the uplink traffics, the downlink traffics and the online durations of the target service types in all the plurality of cells, acquire total traffics of all the target service types and a total online duration of all the target service types, and acquire the actual average rate experienced by the individual user in the plurality of cells.

13. The apparatus according to claim 10, wherein the program codes further cause the processor to:

for each of the target service types in all the plurality of cells, acquire the online durations corresponding to each of the target service types in all the plurality of cells as well as a sum of the online durations corresponding to all the target types in all the plurality of cells, and acquire the weight of the target service types in all the plurality of cells; and acquire the first number of concurrent services of the individual user of each of the target service types by adopting the formula $$C = \sum_{i=1}^{n} \frac{N_i}{M_i} \bigg/ n,$$

according to the second number of the user identifications corresponding to each of the target service types in all the plurality of cells, and the recorded number of each of the target service types under the user identifications corresponding to the target service type;

wherein, C is the first number of concurrent services of the individual user of the target service type, n is the total number of each of the target service types in all the plurality of cells, $N_i$ is the recorded number of an $i^{th}$ target service type in all the plurality of cells, and $M_i$ is the number of users using the $i^{th}$ target service type used in all the plurality of cells.

14. The apparatus according to claim 13, wherein the program codes further cause the processor to:

acquire the target rate experienced by the individual user in each of the plurality of cells, by adopting the formula $$V_O = \sum_{i=1}^{n} V_i \times W_i \times C,$$

according to the target rates of the target service types, the weights of the target service types as well as the first number of concurrent services of the individual user;

wherein, $V_O$ is the target rate experienced by the individual user in each of the plurality of cells, i is a positive integer, $V_i$ is the target rate of the $i^{th}$ target service type, $W_i$ is the weights of the $i^{th}$ target service type in all the plurality of cells, C is an average number of concurrent services of the individual user in all the plurality of cells, and n is the number of the target service types in all the plurality of cells; and according to the uplink traffics, the downlink traffics and the online durations of each of the target service types in all the plurality of cells, acquire the total traffics of all the target service types and a total online duration of all the target service types, and acquire the actual average rate experienced by the individual user in the plurality of cells.

* * * * *